(12) United States Patent
Nimmagadda et al.

(10) Patent No.: US 11,070,589 B2
(45) Date of Patent: Jul. 20, 2021

(54) DYNAMIC IMPLEMENTATION OF A SECURITY RULE

(71) Applicant: Juniper Networks, Inc., Sunnyvale, CA (US)

(72) Inventors: Srinivas Nimmagadda, San Jose, CA (US); Rakesh Kumar, San Ramon, CA (US); Prakash T. Seshadri, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 308 days.

(21) Appl. No.: 15/637,806

(22) Filed: Jun. 29, 2017

(65) Prior Publication Data

US 2019/0007454 A1    Jan. 3, 2019

(51) Int. Cl.
*H04L 29/06* (2006.01)
*H04L 12/851* (2013.01)
*G06F 21/55* (2013.01)

(52) U.S. Cl.
CPC ............ *H04L 63/20* (2013.01); *G06F 21/554* (2013.01); *H04L 47/24* (2013.01); *H04L 63/0263* (2013.01)

(58) Field of Classification Search
CPC ........ H04L 63/20; H04L 47/24; G06F 21/554
USPC .......................................................... 726/1
See application file for complete search history.

(56) References Cited

U.S. PATENT DOCUMENTS

| 7,203,744 B1* | 4/2007 | Parekh | H04L 41/0893 709/223 |
| 9,336,134 B2* | 5/2016 | Danilak | G06F 12/0246 |
| 9,338,134 B2* | 5/2016 | Yin | H04L 63/0236 |
| 9,819,699 B1* | 11/2017 | Nenov | H04L 63/0263 |
| 10,135,727 B2* | 11/2018 | Gude | H04L 45/72 |
| 2004/0177139 A1* | 9/2004 | Schuba | H04L 67/322 709/223 |

(Continued)

FOREIGN PATENT DOCUMENTS

| CN | 101854340 A | 10/2010 |
| CN | 103853986 A | 6/2014 |
| CN | 106060040 A | 10/2016 |

OTHER PUBLICATIONS

Extended European Search Report for Application No. EP18175003.5, dated Feb. 12, 2019, 22 pages.

(Continued)

*Primary Examiner* — Dereena T Cattungal
(74) *Attorney, Agent, or Firm* — Harrity & Harrity, LLP

(57) ABSTRACT

A device may receive information identifying a set of conditions related to controlling implementation of a set of security rules. The set of conditions may be associated with a set of security actions that a device is to perform based on whether the set of conditions is satisfied. The device may determine the set of security rules that is to be controlled by the set of conditions using information related to the set of security rules. The device may modify information related to the set of security rules to cause the implementation of the set of security rules to be controlled by the set of conditions. The modification to cause the device to process the set of security rules to dynamically implement the set of security actions based on satisfaction of the set of conditions. The device may perform an action after modifying the information.

20 Claims, 7 Drawing Sheets

(56) References Cited

U.S. PATENT DOCUMENTS

| | | | | |
|---|---|---|---|---|
| 2005/0273851 | A1* | 12/2005 | Raju Datla | H04L 63/1425 726/14 |
| 2005/0276262 | A1* | 12/2005 | Schuba | G06N 5/025 370/389 |
| 2010/0054241 | A1* | 3/2010 | Shah | H04L 45/30 370/389 |
| 2010/0205297 | A1* | 8/2010 | Sarathy | H04L 43/00 709/224 |
| 2010/0205665 | A1* | 8/2010 | Komili | H04L 67/2819 726/12 |
| 2014/0331280 | A1* | 11/2014 | Porras | H04L 63/20 726/1 |
| 2016/0191466 | A1* | 6/2016 | Pernicha | H04L 63/20 726/1 |

OTHER PUBLICATIONS

Seungwon S., et al., "Avant-Guard: Scalable and Vigilant Switch Flow Management in Software-Defined Networks," Proceedings of the 2013 ACM SIGSAC Conference on Computer & Communications Security, Jan. 2013, pp. 413-424.

* cited by examiner

DYNAMIC IMPLEMENTATION OF A SECURITY RULE

BACKGROUND

A network security policy may include a document that outlines rules for computer network access, network traffic, and/or the like. The rules may govern data access, web-browsing habits, use of passwords and encryption, email attachments, and/or the like. The network security policy may specify the rules for individuals or for groups of individuals throughout a company.

SUMMARY

According to some possible implementations, a device may include one or more processors to receive information identifying a set of conditions and a set of security actions. The set of conditions may control implementation of a set of security rules. The set of security actions may be associated with the set of conditions. The device may perform the set of security actions when the set of conditions is satisfied and the set of security rules applies to traffic. The device may determine the set of security rules that is to be controlled by the set of conditions. The set of security rules may be associated with a network security policy. The device may modify information related to the set of security rules to cause the implementation of the set of security rules to be controlled by the set of conditions. The set of security rules may have not been associated with the set of conditions prior to modifying the information related to the set of security rules. The modification may cause the device to process the set of security rules to dynamically implement the set of security actions based on satisfaction of the set of conditions. The modification may permit implementation of the set of security rules to be adaptive to a set of changes in a network. The device may perform an action after modifying the information related to the set of security rules.

According to some possible implementations, a non-transitory computer-readable medium may store one or more instructions that, when executed by one or more processors, cause the one or more processors to receive information identifying a set of conditions related to controlling implementation of a set of security rules. The set of conditions may be associated with a set of security actions that a device is to perform based on whether the set of conditions is satisfied. The one or more instructions, when executed by the one or more processors, may cause the one or more processors to determine the set of security rules that is to be controlled by the set of conditions using information related to the set of security rules. The set of security rules may be associated with a network security policy. The one or more instructions, when executed by the one or more processors, may cause the one or more processors to modify information related to the set of security rules to cause the implementation of the set of security rules to be controlled by the set of conditions. The set of security rules may have not been associated with the set of conditions prior to modifying the information related to the set of security rules. The modification may cause the device to process the set of security rules to dynamically implement the set of security actions based on satisfaction of the set of conditions. The modification may permit implementation of the set of security rules to be adaptive to a set of changes in a network. The one or more instructions, when executed by the one or more processors, may cause the one or more processors to perform an action after modifying the information related to the set of security rules. The action may include determining whether the set of conditions is satisfied.

According to some possible implementations, a method may include receiving, by a device, information identifying a set of conditions and a set of security actions. The set of conditions may control implementation of a set of security rules. The device may perform the set of security actions based on whether the set of conditions is satisfied. The method may include determining, by the device, the set of security rules that is to be controlled by the set of conditions using information related to the set of security rules. The information related to the set of security rules may identify a source of traffic to which the set of security rules applies, or a destination of traffic to which the set of security rules applies. The method may include modifying, by the device, the information related to the set of security rules to cause the device to determine whether the set of conditions is satisfied prior to performing the set of security actions. The set of security rules may have not been associated with the set of conditions prior to modifying the information related to the set of security rules. The modification may cause the device to process the set of security rules to dynamically implement the set of security actions based on satisfaction of the set of conditions. The modification may permit implementation of the set of security rules to be adaptive to a set of changes in a network. The method may include performing, by the device, a security action, of the set of security actions, after modifying the information related to the set of security rules.

DETAILED DESCRIPTION

Figure 1A:
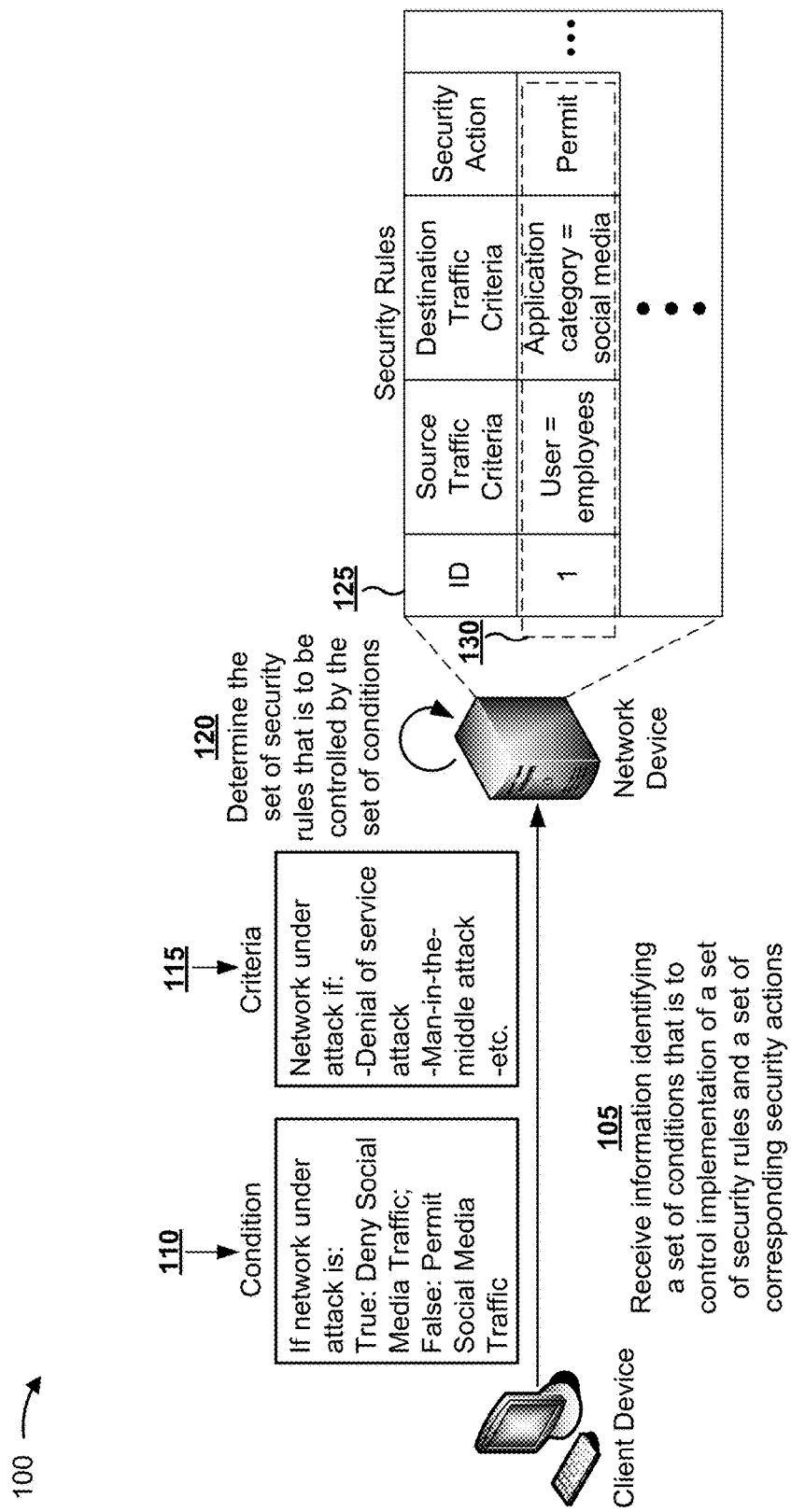
FIGS. 1A and 1B are diagrams of an overview of an example implementation described herein.

The following detailed description of example implementations refers to the accompanying drawings. The same reference numbers in different drawings may identify the same or similar elements.

A network administrator may want to implement different sets of security rules in different scenarios. For example, the network administrator may want to implement a first set of security rules on a holiday (e.g., when traffic on a network may satisfy a threshold), a second set of security rules when a network is under attack, a third set of security rules during working hours, a fourth set of security rules during non-working hours, and/or the like. In some cases, the network administrator may have to manually configure a set of security rules to implement a particular set of security rules (e.g., by turning particular security rules on or off, modifying security actions that a security rule implements, etc.). This may consume time of the network administrator, reduce an efficiency of modifying a set of security rules for different scenarios (e.g., reduce an efficiency of responding to a network attack, which may result in consumption of, or damage to, network resources), consume memory resources of a network device via storing multiple sets of security rules for use in different scenarios, and/or the like. In addition, errors in implementing security rules in different scenarios, such as incorrectly turning on or off security rules, may consume processing resources of a network device through dropped or failed communications, improper handling of traffic, and/or the like.

Some implementations, described herein, provide a network device that is capable of automatically configuring a set of security rules, such that a security action performed based on the set of security rules varies depending on satisfaction of various conditions. For example, the network device may configure a security rule such that the network device performs a first security action when the security rule applies to traffic when a first condition is satisfied and performs a second security action when the security rule applies when a second condition is satisfied. In this way, the network device may automatically and dynamically implement a set of security rules based on various criteria being satisfied.

This permits the network device to quickly and efficiently perform various security actions in different scenarios, thereby increasing an efficiency of responding to different scenarios. In addition, this conserves network resources that would otherwise be consumed or damaged due to a delayed response to a particular scenario (e.g., a network attack, a threshold traffic scenario, etc.). Further, this reduces an amount of time needed to reconfigure a set of security rules for different scenarios, thereby increasing an efficiency of reconfiguring a set of security rules. Further, this conserves processing resources of the network device that would otherwise be consumed due to errors in manual modification of security rules to implement different security rules in different scenarios. Further, this conserves memory resources of the network device by reducing or eliminating a need for the network device to store multiple sets of security rules for multiple scenarios.

Figure 1B:
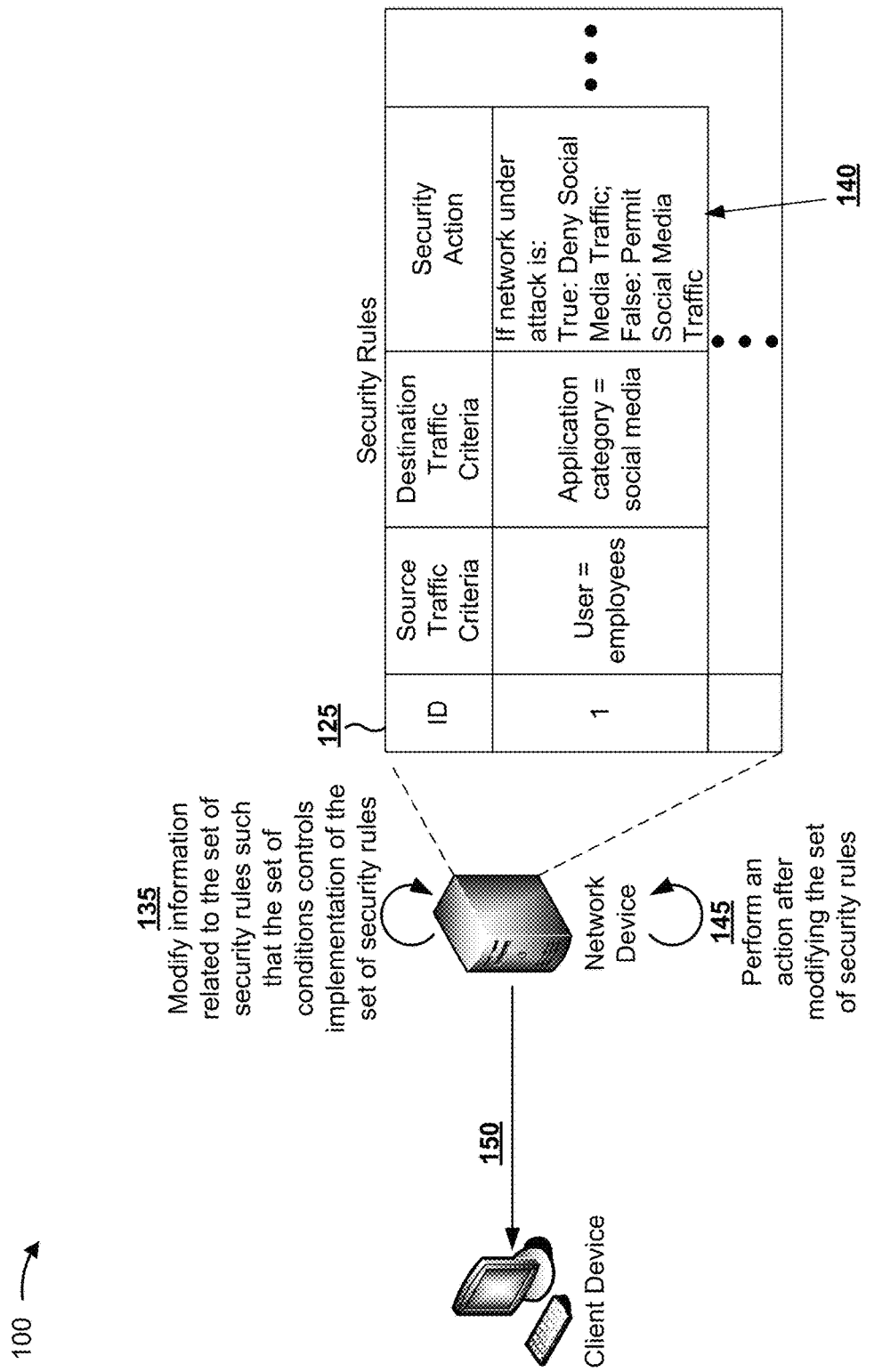

FIGS. 1A and 1B are diagrams of an overview of an example implementation 100 described herein. As shown in FIGS. 1A and 1B, example implementation 100 may include a network device and a client device. Although FIGS. 1A and 1B show a single network device and a single client device, in practice, there may be hundreds, thousands, millions, etc. of network devices and/or client devices. FIGS. 1A and 1B show an example of a network device configuring a set of security rules to implement various security actions based on satisfaction of various conditions. In practice, the network device may configure hundreds, thousands, millions, etc. of security rules. In this way, the network device may process a set of security rules that cannot be processed manually or objectively by a human actor.

As shown in FIG. 1A, and as shown by reference number 105, the network device may receive information identifying a set of conditions that is to control implementation of a set of security rules and a set of corresponding security actions. For example, the network device may receive the information from the client device (e.g., based on input from a user of the client device). In some implementations, the set of conditions may relate to a set of scenarios when a security rule is to be applied. For example, a first condition may relate to a first scenario, a second condition may relate to a second scenario, and/or the like. In some implementations, the network device may perform the set of security actions depending on whether the set of conditions is satisfied. For example, the network device may perform different security actions in different scenarios when different conditions are satisfied. In some implementations, the set of conditions may be intended to control thousands, millions, billions, etc. of security rules.

As further shown in FIG. 1A, and as shown by reference number 110, a condition may be associated with a set of security actions. For example, a condition may relate to whether a network is under attack, and the set of security actions may differ based on whether the network is under attack. In this case, if the network is under attack ("True"), then the network device is to deny social media traffic. Similarly, if the network is not under attack ("False"), then the network device is to permit social media traffic. In this way, a condition may relate to dynamically implementing different security actions in different scenarios (e.g., scenarios where a network is under attack or not under attack).

As further shown in FIG. 1A, and as shown by reference number 115, the network device may receive information identifying a set of criteria related to the set of conditions. In some implementations, a set of criteria may be used to determine whether a set of conditions is satisfied. For example, the network device may determine that a network is under attack if the network device determines that the network is experiencing a denial of service attack, a man-in-the-middle attack, and/or the like. Additionally, or alternatively, and as another example, the network device may receive an indication from a user of the client device or from an external device (e.g., an external security analytics device) that a set of conditions is satisfied (e.g., that a network is under attack). In this way, the network device may determine whether a set of conditions is satisfied based on a set criteria (e.g., to permit the network device to determine a set of security actions to perform).

As further shown in FIG. 1A, and as shown by reference number 120, the network device may determine the set of security rules that are to be controlled by the set of conditions. In some implementations, the network device may determine particular security rules to modify such that the particular security rules are controlled by the set of conditions. For example, the network device may determine a set of security rules included in a network security policy that is to be used to implement a set of security actions based on whether a network is under attack.

As further shown in FIG. 1A, reference number 125 shows an example set of security rules included in a network security policy. As further shown by reference number 125, a security rule may include information identifying a source of traffic to which the security rule is to apply (e.g., source traffic criteria), a destination of traffic to which a security rule is to apply (e.g., destination traffic criteria), a security action that the network device is to perform when the security rule applies to traffic, and/or the like.

As further shown in FIG. 1A, and as shown by reference number 130, the network device may identify a security rule that is to be controlled by the set of conditions received from the client device. For example, the network device may identify the security rule based on the set of conditions and the security rule applying to the same source of traffic, the same destination of traffic, and/or the like. In this case, the network device may parse the set of conditions and/or the security rule to identify an identifier included in the set of conditions and/or the security rule, a term and/or phrase included in the set of conditions and/or the security rule (e.g., using natural language processing), and/or the like that identifies a manner in which the set of conditions and/or the security rule is to apply. Continuing with the previous example, the network device may determine that security rule 1 (e.g., identified by reference number 130) is to be controlled by the set of conditions based on the set of conditions and security rule 1 both applying to social media traffic.

As shown in FIG. 1B, and as shown by reference number 135, the network device may modify the set of security rules such that the set of conditions controls implementation of the set of security rules. For example, the network device may modify information related to the set of security rules to cause the set of security rules to be controlled by the set of conditions (e.g., a data structure that stores information related to the set of security rules).

As further shown in FIG. 1B, and by reference number 140, the network device may modify a security action for a security rule (e.g., security rule 1) to cause the security rule to be controlled by the set of conditions. In this case, the network device may modify information related to the security rule such that the information indicates that a security action that the network device is to perform depends on satisfaction of a condition. For example, as shown, the network device may modify the information related to the security rule such that the network device denies social media traffic when the network is under attack and permits social media traffic when the network is not under attack. In some implementations, a user of the client device may modify a security action for a security rule to cause the security rule to be controlled by the set of conditions. In this way, the network device may modify a security rule to permit dynamic implementation of the security rule.

As further shown in FIG. 1B, and as shown by reference number 145, the network device may perform an action after modifying the set of security rules. For example, the network device may perform an action to monitor traffic, to monitor the network to determine whether a set of conditions is satisfied (e.g., whether the network is under attack), to generate a report related to modifying the set of security rules to be controlled by the set of conditions, and/or the like. As shown by reference number 150, the network device may provide information related to a security rule, a condition, and/or a security action, for display via the client device. In addition, the network device may perform a security action based on whether a condition is satisfied. For example, if the network device determines that the network is under attack, then the network device may deny social media traffic from being exchanged via the network. Additionally, or alternatively, and as another example, the network device may permit social media traffic via a network if the network device determines that the network is not under attack.

In this way, the network device may automatically and dynamically implement a set of security rules based on various criteria being satisfied. This permits the network device to quickly and efficiently perform various security actions in different scenarios, thereby increasing an efficiency of responding to different scenarios. In addition, this conserves network resources that would otherwise be consumed or damaged due to a delayed response to a particular scenario (e.g., a network attack, a threshold traffic scenario, etc.). Further, this reduces an amount of time needed to reconfigure a set of security rules for different scenarios, thereby increasing an efficiency of reconfiguring a set of security rules. Further, this conserves processing resources of the network device that would otherwise be consumed due to errors in manual modification of security rules to implement different security rules in different scenarios. Further, this conserves memory resources of the network device by reducing or eliminating a need for the network device to store multiple sets of security rules for multiple scenarios.

As indicated above, FIGS. 1A and 1B are provided merely as an example. Other examples are possible and may differ from what was described with regard to FIGS. 1A and 1B. For example, and in a retail context, a retail organization may want to minimize non-revenue-generating traffic during a particular time period or day of the year (e.g., Black Friday). Continuing with the previous example, the implementations described herein may permit the retail organization to quickly and efficiently configure a set of security rules such that the security rules implement different security actions based on the particular time period or day of the year (e.g., based on a set of conditions being satisfied). This simplifies generation of conditions that control implementation of a set of security rules and creates a dynamic network security policy based on customer defined conditions.

Figure 2:
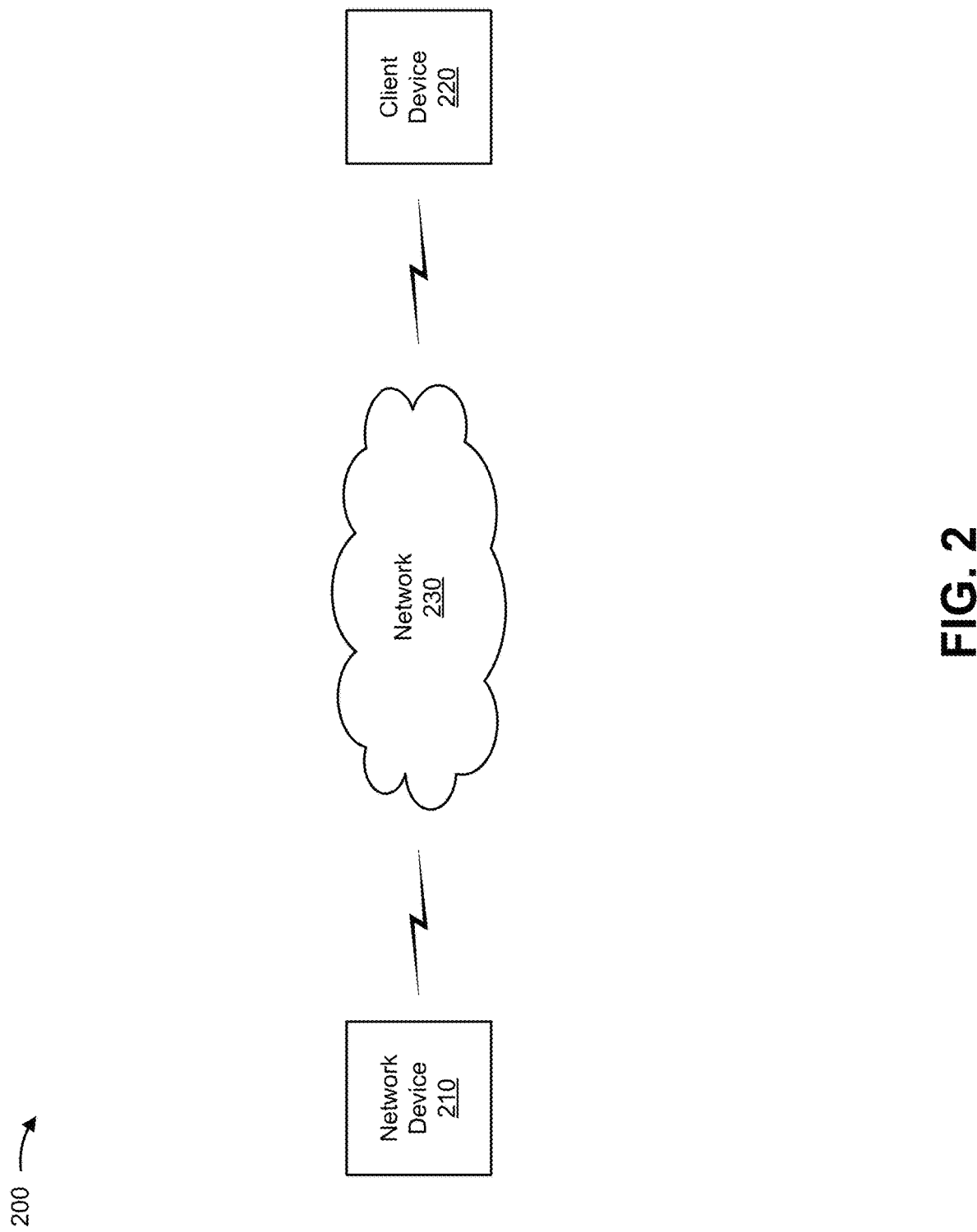
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a client device 220, and a network 230. Devices of environment 200 may interconnect via wired connections, wireless connections, or a combination of wired and wireless connections.

Network device 210 includes one or more devices (e.g., one or more traffic transfer devices) capable of receiving, generating, storing, processing, and/or providing information related to a security rule. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may receive information identifying set of conditions to control a set of security rules, as described elsewhere herein. Additionally, or alternatively, network device 210 may modify a set of security rules such that a security action performed when the set of security rules applies to traffic varies by satisfaction of a set of conditions, as described elsewhere herein. In some implementations, network device 210 may be a physical device implemented within a housing, such as a chassis. In implementations, network device 210 may be a virtual device implemented by one or more computer devices of a cloud computing environment or a data center. Although FIG. 2 shows a single network device 210, in practice, there may be hundreds, thousands, millions, etc. of network devices 210.

Client device 220 includes one or more devices capable of receiving, generating, storing, processing, and/or providing information associated with a security rule. For example, client device 220 may include mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar device. In some implementations, client device 220 may provide, to network device 210, a set of conditions that are to control a set of security rules, as described elsewhere herein. Additionally, or alternatively, client device 220 may receive information from network device 210 that indicates a manner in which a set of security rules were modified to be controlled by a set of conditions, as described elsewhere herein. Although FIG. 2 shows a single client device 220, in practice, there may be hundreds, thousands, millions, etc. of client devices 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
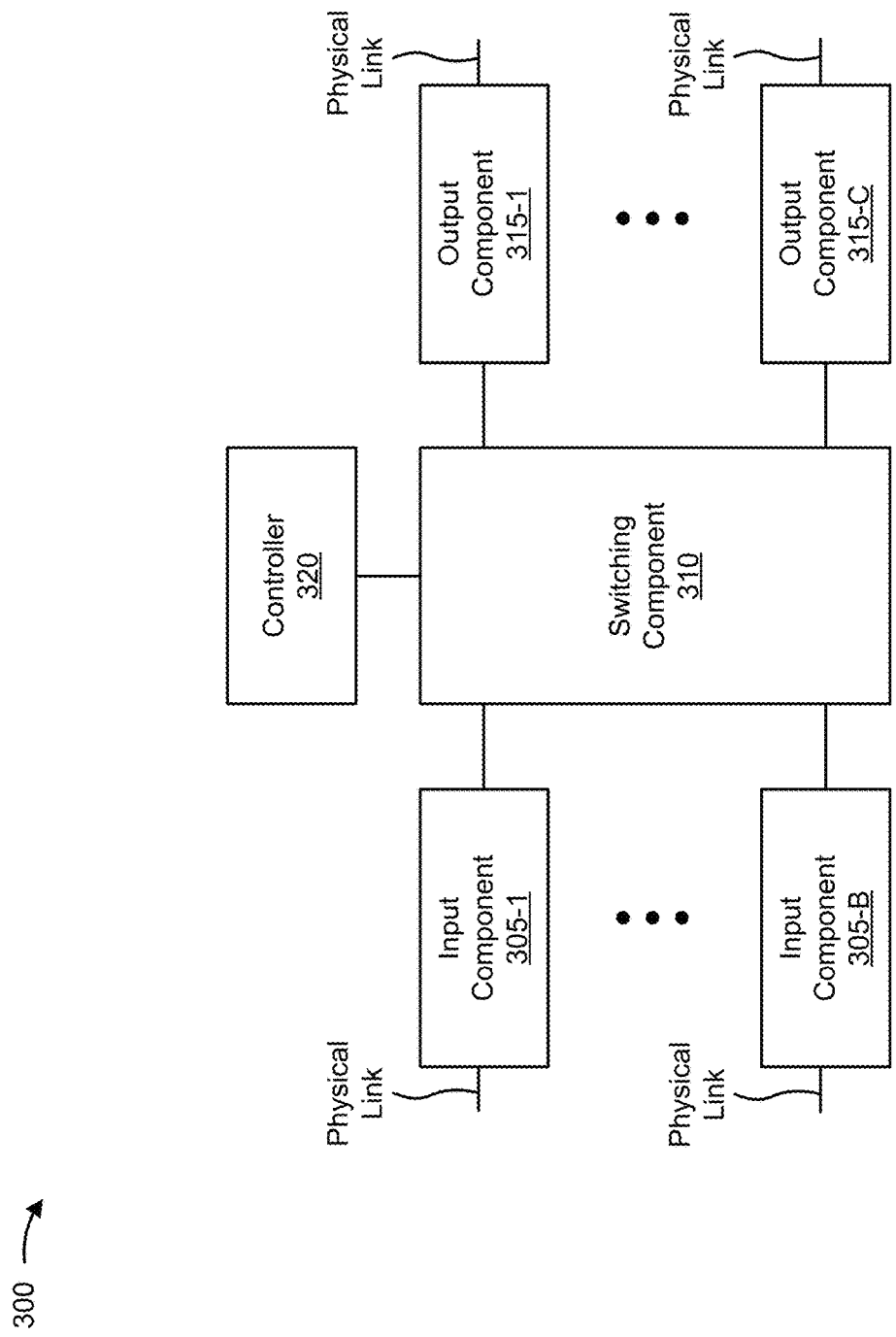
FIG. 3 is a diagram of example components of one or more devices of FIG. 2.

FIG. 3 is a diagram of example components of a device 300. Device 300 may correspond to network device 210 and/or client device 220. In some implementations, network device 210 and/or client device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
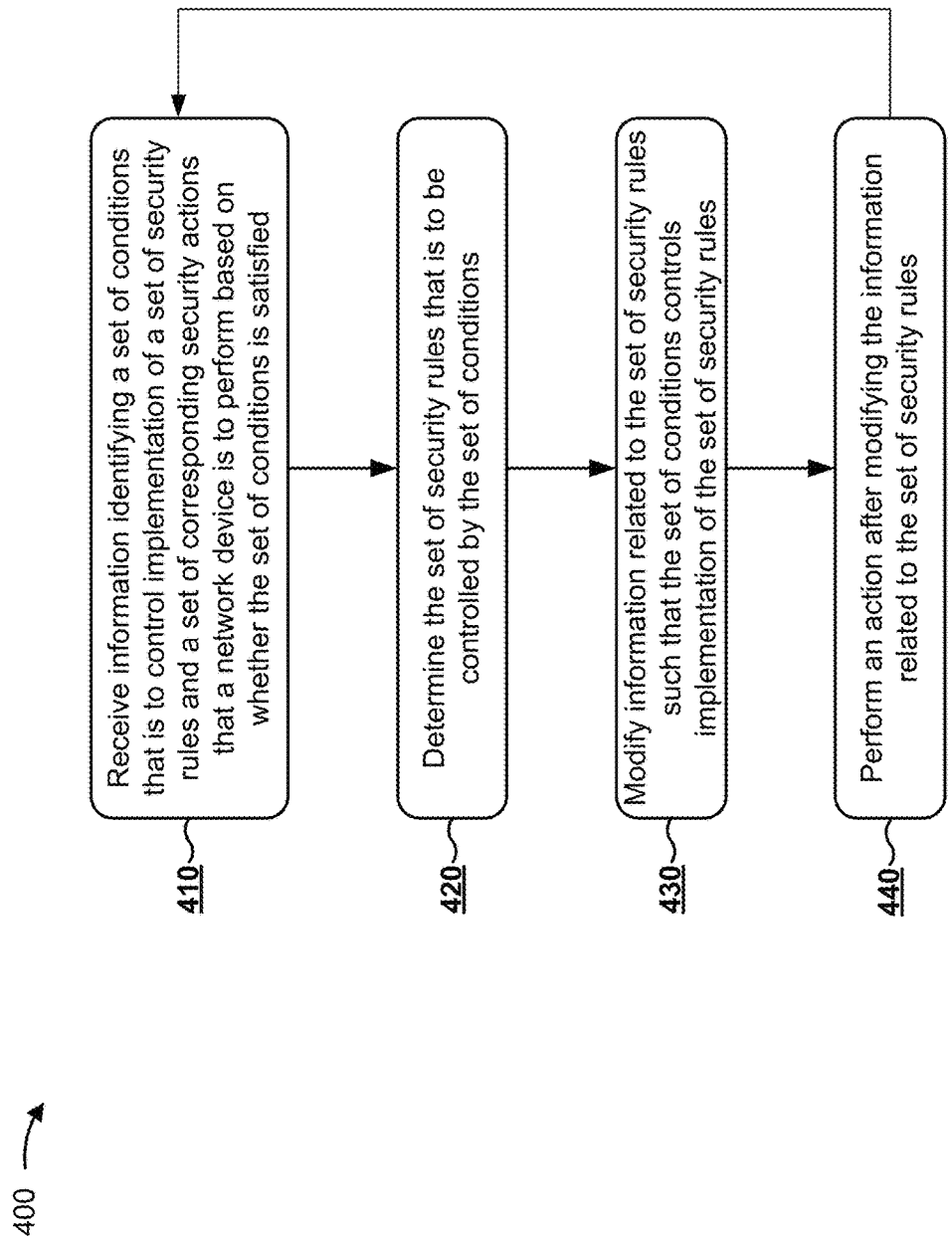
FIG. 4 is a flow chart of an example process for dynamic implementation of a security rule.

FIG. 4 is a flow chart of an example process 400 for dynamic implementation of a security rule. In some implementations, one or more process blocks of FIG. 4 may be performed by network device 210. In some implementations, one or more process blocks of FIG. 4 may be performed by another device or a group of devices separate from or including network device 210, such as client device 220 and/or a management system associated with network device 210. FIG. 4 shows an example of network device 210 modifying information related to a set of security rules such that implementation of the set of security rules is controlled by a set of conditions with which the set of security rules was not previously associated.

As shown in FIG. 4, process 400 may include receiving information identifying a set of conditions that is to control implementation of a set of security rules and a set of corresponding security actions that a network device is to perform based on whether the set of conditions is satisfied (block 410). For example, network device 210 may receive information identifying a set of conditions that is to control implementation of a set of security rules and a set of corresponding security actions that network device 210 is to perform based on whether the set of conditions is satisfied. In some implementations, network device 210 may receive the information periodically, according to a schedule, based on input from a user of client device 220, based on requesting the information, and/or the like. In some implementations, network device 210 may receive information identifying thousands, millions, billions, etc. of conditions. In this way, network device 210 may receive information that cannot be processed manually or objectively by a human actor.

In some implementations, a condition may relate to a scenario in which a security rule is to be applied (or not applied). In some implementations, a condition may control implementation of a security rule. For example, satisfaction of a condition may cause network device 210 to perform a first security action, and non-satisfaction, or satisfaction in a different manner (e.g., satisfaction of a first threshold rather than a second threshold), may cause network device 210 to perform a second security action, when a security rule applies to traffic. In some implementations, and for example, a condition may relate to whether network 230 is under attack, whether the current day corresponds to a particular day of the year (e.g. Black Friday), whether network 230 is undergoing maintenance, and/or the like. In some implementations, network device 210 may use various criteria to determine whether a condition is satisfied. For example, criteria may include a threshold value, a particular value, input from a user of client device 220, and/or the like that network device 210 may use to determine whether a condition is satisfied.

In some implementations, a security rule may include a rule related to access to network 230, traffic that is permitted via network 230, and/or the like. In some implementations, a security rule may be associated with a network security policy. For example, a set of security rules may form a network security policy. In some implementations, a network security policy may include thousands, millions, billions, trillions, etc. of security rules.

In some implementations, a security rule may be associated with a security action. In some implementations, a security action may include an action that network device 210 is to perform when network device 210 identifies traffic to which a security rule applies. For example, a security action may include permitting traffic, denying traffic, logging traffic, routing traffic, and/or the like.

In some implementations, traffic may refer to a set of packets. In some implementations, a packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 230.

In this way, network device 210 may receive information identifying a set of conditions that is to control implementation of a set of security rules and a set of corresponding security actions that network device 210 is to perform based on whether the set of conditions is satisfied.

As further shown in FIG. 4, process 400 may include determining the set of security rules that is to be controlled by the set of conditions (block 420). For example, network device 210 may determine the set of security rules that is to be controlled by the set of conditions. In some implementations, network device 210 may determine the set of security rules after receiving the information identifying the set of conditions, based on receiving an indication from a user of client device 220 to determine the set of security rules, after receiving a threshold amount of the information identifying a set of conditions, and/or the like. In some implementations, network device 210 may determine thousands, millions, billions, etc. of security rules. In this way, network device 210 may determine a set of security rules that cannot be determined or processed manually or objectively by a human actor.

In some implementations, network device 210 may determine the set of security rules using one or more techniques. For example, network device 210 may perform a comparison of identifiers that identify a source of traffic, a destination of traffic, and/or the like associated with the set of conditions and the set of security rules and may determine the set of security rules that is to be controlled by the set of conditions when a result of the comparison indicates a match. Additionally, or alternatively, and as another example, network device 210 may perform a comparison of identifiers that identify a port associated with the source or the destination, a channel used for communicating traffic to and/or from the source or the destination, a protocol used for communicating traffic to and/or from the source or the destination, a flow associated with traffic to and/or from the source or the destination, a data center associated with the source or the destination, an edge device associated with the source or the destination, a particular network device 210 to which the source or the destination communicates, an entity associated with the source or the destination, and/or the like. In some implementations, network device 210 may parse information related to the set of conditions and the set of security rules to determine the identifier.

In some implementations, network device 210 may identify a term and/or phrase included in information identifying the set of conditions and/or the set of security rules (e.g., using natural language processing, computational linguistics, text analysis, etc.) and may determine whether the set of security rules and/or the set of conditions have a matching term and/or phrase. For example, network device 210 may determine the set of security rules that is to be controlled by the set of conditions when a comparison of terms and/or phrases associated with the set of conditions and the set of security rules indicates a match. In some implementations, network device 210 may determine the set of security rules using input from a user of client device 220. For example, a user of client device 220 may input information that identifies a set of security rules that is to be controlled by a set of conditions.

In some implementations, network device 210 may determine a set of security rules based on an intent of the set of security rules. In some implementations, network device 210 may determine an intent based on input from a user of client device 220 (e.g., based on a selection from a set of pre-defined intents). In some implementations, network device 210 may determine an intent using information associated with a set of security rules (e.g., where the intent is indicated by a set of security actions, by information that identifies a source and/or destination of traffic to which the set of security rules is to apply, etc.). In some implementations, network device 210 may determine an intent of a set of security rules by parsing (e.g., analyzing or processing) information associated with the set of security rules. For example, network device 210 may identify identifiers included in the information that identify a set of security actions network device 210 is to perform when the set of security rules applies to traffic, a source of traffic to which a set of security rules is to apply, a destination of traffic to which a set of security rules is to apply, and/or the like.

In some implementations, network device 210 may determine an intent by using natural language processing, text analysis, computational linguistics, and/or the like (e.g., to identify a term, a phrase, and/or the like that identifies an intent of the set of security rules). For example, network device 210 may determine that a set of security rules is intended to apply to employees, or a subset of employees, based on a term and/or phrase included in the information associated with the set of security rules indicating that the set of security rules is to apply to employees or a subset of employees.

In some implementations, network device 210 may determine an intent by using machine learning. For example, network device 210 may determine an intent of a set of security rules based on determining that the set of security rules is similar to a set of security rules on which network device 210 was trained (e.g., where network device 210 was trained on a data set that identifies various security rules and corresponding intents).

In some implementations, when using machine learning, network device 210 may train a model to determine an intent of a set of security rules. For example, network device 210 may train a model to determine an intent based on a destination of traffic to which a set of security rules is to apply, a source of traffic to which a set of security rules is to apply, a set of security actions performed when a set of security rules applies, and/or the like. In some implementations, a device external to network device 210 may perform the machine learning. For example, the external device may perform machine learning for multiple network devices 210 and may provide information related to a result of the machine learning to the multiple network devices 210 to permit the network devices 210 to determine an intent. In some implementations, the multiple network devices 210 may provide information to the external device related to a result of identifying an intent of a set of security rules, such as to improve the machine learning by the external device.

In some implementations, use of machine learning may permit network device 210 to identify information related to a set of security rules that is indicative of an intent of a set of security rules. For example, network device 210 may determine that information identifying a source of traffic to which the set of security rules is to apply is more indicative of an intent of the set of security rules than information identifying a destination of traffic to which the set of security rules applies. This conserves processing resources of network device 210 by permitting network device 210 to quickly and efficiently determine an intent of a set of security rules. In some implementations, network device 210 may weight different information related to a set of security rules and may determine an intent of the set of security rule using a weighted score for the set of security rules, an average of weights associated with different information related to the set of security rules, and/or the like.

In some implementations, network device 210 may determine a set of security rules when an intent of a set of security rules and an intent of a set of conditions match. In some implementations, when determining whether an intent of the set of security rules and an intent of a set of conditions match, network device 210 may determine whether the information related to the set of security rules and the set of conditions, or portions thereof, match. For example, network device 210 may determine whether a set of security rules and a set of conditions are associated with the same source, the same destination, etc. Continuing with the previous example, network device 210 may determine that an intent of a set of security rules and an intent of a set of conditions match when the set of security rules and the set of conditions apply to the same source, the same destination, etc.

Additionally, or alternatively, network device 210 may perform a weighted match of information related to a set of security rules and a set of conditions (e.g., where information identifying a source of traffic is weighted more than information identifying a destination of traffic) and may determine a match when information associated with a threshold weight matches. Additionally, or alternatively, network device 210 may determine a measure of similarity for information related to the set of security rules and the set of conditions. For example, a measure of similarity may be based on similar terms and/or phrases included in the information, the set of security rules and the set of conditions applying to similar types of sources or destinations (e.g., applications, devices, geographic locations, etc.), and/or the like. Additionally, or alternatively, network device 210 may determine a score based on an amount of information that matches between the set of security rules and the set of conditions and may determine a match when the score satisfies a threshold.

In some implementations, when network device 210 is included in a cloud computing environment, another device may determine a set of security rules. For example, network device 210 may provide information to the other device that identifies security rules of a network security policy that network device 210 is storing. In this case, the other device may determine the set of security rules that is to be controlled by the set of conditions and may provide information to network device 210 that indicates the set of security rules.

In this way, network device 210 may determine the set of security rules that is to be controlled by the set of conditions, to permit network device 210 to modify information related to the set of security rules such that the set of security rules is controlled by the set of conditions.

As further shown in FIG. 4, process 400 may include modifying information related to the set of security rules such that the set of conditions controls implementation of the set of security rules (block 430). For example, network device 210 may modify information related to the set of security rules such that the set of conditions controls implementation of the set of security rules. In some implementations, network device 210 may modify the set of security rules after determining the set of security rules that is to be controlled by the set of conditions, based on receiving input from a user of client device 220, and/or the like. In some implementations, network device 210 may modify information related to thousands, millions, billions, etc. of security rules, thereby modifying information related to a set of security rules that cannot be processed manually or objectively by a human actor.

In some implementations, a modification to information related to the set of security rules may cause network device 210 to process the set of security rules to dynamically implement the set of security actions based on satisfaction of the set of conditions. For example, a modification may cause network device 210 to implement different security actions based on different conditions being satisfied. Additionally, or alternatively, a modification may permit implementation of the set of security rules to be adaptive to a set of changes in network 230 (e.g., changes to a location where an application is running or executing, where a user is being connected to network 230, an environment of network 230, etc.). This improves use of a set of security rules relative to a set of security rules that cannot be implemented dynamically or adaptively.

In some implementations, network device 210 may modify the set of security rules by modifying information associated with the set of security rules such that implementation of the set of security rules is controlled by the set of conditions. For example, network device 210 may modify information identifying a set of security actions to be performed when the set of security rules applies to traffic. In this case, network device 210 may modify the set of security rules such that the set of security actions to be performed depends on satisfaction of the set of conditions. In this way, when network device 210 performs a lookup of a set of security actions for a set of security rules, network device 210 may determine whether a set of conditions is satisfied to determine a set of security actions to perform.

Additionally, or alternatively, network device 210 may generate and/or store a set of instructions that indicate that a set of security rules is to be controlled by a set of conditions. For example, the set of instructions may cause network device 210 to determine whether a set of conditions is satisfied to determine a set of security actions to perform when a set of security rules applies to traffic. In this way, network device 210 may generate and/or store a set of instructions that causes network device 210 to determine whether a set of conditions is satisfied to determine a set of security actions to perform when the set of security rules applies to traffic.

In some implementations, network device 210 may modify information in a data structure to include information identifying the set of conditions, a corresponding set of security rules that is to be controlled by the set of conditions, and/or the like. In this case, when network device 210 determines that a set of rules applies to traffic, network device 210 may use the data structure to determine a set of security actions to perform based on whether the set of conditions is satisfied. In this way, network device 210 may modify information in a data structure to cause network device 210 to determine whether a set of conditions is satisfied to determine a set of security actions to perform when a set of security rules applies to traffic.

In some implementations, network device 210 may perform an analysis of a network security policy after modifying the information related to the set of security rules. For example, network device 210 may perform a test of a network security policy to determine whether security rules associated with the network security policy conflict (e.g., where a first security rule indicates dropping a packet and a second security rule indicates permitting the same packet), whether a security rule is non-operational, and/or the like. This improves modifications to a network security policy and/or to a set of security rules by reducing or eliminating errors related to modifying the network security policy and/or the set of security rules.

In this way, network device 210 may modify information related to the set of security rules such that the set of conditions controls implementation of the set of security rules.

As further shown in FIG. 4, process 400 may include performing an action after modifying the information related to the set of security rules (block 440). For example, network device 210 may perform an action after modifying the information related to the set of security rules. In some implementations, network device 210 may perform an action related to thousands, millions, billions, etc. of security rules, thereby processing a set of security rules that cannot be processed manually or objectively by a human actor.

In some implementations, for example, network device 210 may perform an action to monitor traffic (e.g., exchanged via network device 210) to determine when to implement a security rule. Additionally, or alternatively, and as another example, network device 210 may perform an action to determine whether a condition is satisfied. For example, network device 210 may monitor network 230 to detect when network 230 is under attack (e.g., based on a source of traffic, based on a pattern of traffic, based on an indication from a user of client device 220, based on a volume of traffic, etc.), to determine whether the current day is a particular day of the week, month, year, etc., to determine whether network 230 is undergoing maintenance, and/or the like. In some implementations, network device 210 may receive an indication from a user of client device 220 that a set of conditions is satisfied.

Additionally, or alternatively, and as another example, network device 210 may perform an action to request, from a user of client device 220, confirmation of modifications to information related to the set of security rules (e.g., prior to modifying information related to a set of security rules). Additionally, or alternatively, and as another example, network device 210 may perform an action to store information identifying the modifications to permit network device 210 to generate recommended modifications for another set of security rules, to improve future identification of a set of security rules to be controlled by a set of conditions, to improve identification of a set of security rules to be controlled by a set of conditions by another network device 210, and/or the like.

Additionally, or alternatively, and as another example, network device 210 may perform an action to generate a report related to the set of security rules. For example, when a condition is satisfied, network device 210 may generate a report that includes information identifying a set of security rules that is causing network device 210 to implement different security actions based on a condition being satisfied, information identifying pre-satisfaction and post-satisfaction security actions for a set of security rules, information identifying a set of security rules that is controlled by a set of conditions, and/or the like. In some implementations, the report may identify whether a conflict exists between security rules, whether a particular security rule was overridden based on the conflict, and/or the like. In some implementations, and as another example, prior to implementing different security actions based on satisfaction of a set of conditions, network device 210 may provide the report for display to permit a user of client device 220 to confirm performance of the different security actions.

Additionally, or alternatively, and as another example, network device 210 may perform an action to store information and/or generate a report related to modifications to information related to a set of security rules. Continuing with the example, network device 210 may store information identifying a modification to a set of security rules, a date and/or time that a condition is satisfied (and a user that may have provided an indication that the condition was satisfied), security rules that are implementing different security actions as a result of a condition being satisfied, and/or the like.

In this way, network device 210 may perform an action after modifying the information related to the set of security rules.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
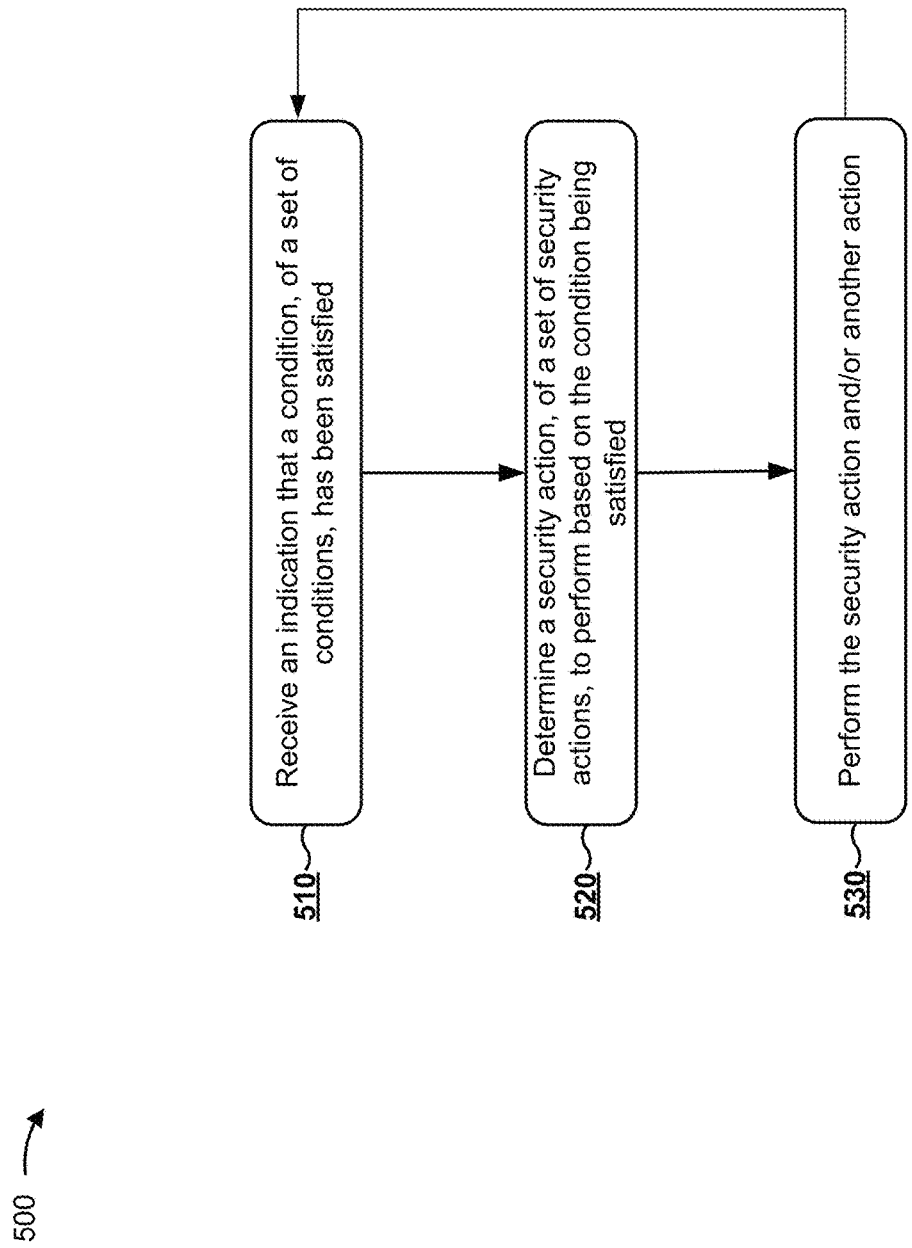
FIG. 5 is a flow chart of an example process for dynamic implementation of a security rule.

FIG. 5 is a flow chart of an example process 500 for dynamic implementation of a security rule. In some implementations, one or more process blocks of FIG. 5 may be performed by network device 210. In some implementations, one or more process blocks of FIG. 5 may be performed by another device or a group of devices separate from or including network device 210, such as client device 220. FIG. 5 shows an example process related to determining a security action to perform based on a condition being satisfied.

As shown in FIG. 5, process 500 may include receiving an indication that a condition, of a set of conditions, has been satisfied (block 510). For example, network device 210 may receive an indication that a condition, of a set of conditions, has been satisfied. In some implementations, network device 210 may receive the indication based on monitoring for satisfaction of a condition, based on input from a user of client device 220, and/or the like. In some implementations, network device 210 may receive an indication that thousands, millions, billions, etc. of conditions have been satisfied, thereby receiving information that cannot be processed manually or objectively by a human actor.

In some implementations, network device 210 may receive an indication, or determine, that a condition has been satisfied by monitoring for the indication. For example, network device 210 may receive an indication by monitoring network 230 and/or traffic via network 230, such as traffic from a particular source, by determining whether network 230 is under attack (e.g., based on identifying a pattern of traffic via network 230, based on a type of traffic via network 230, based on a volume of traffic, etc.), whether a particular event is occurring (e.g., a particular day of the year, an outage of a portion of network 230, maintenance on network 230, etc.), and/or the like. Additionally, or alternatively, and as another example, network device 210 may monitor a set of users associated with network 230 (e.g., activity of the set of users, where the set of users is being connected to network 230, etc.), a location where an application is running, executing, or being hosted, traffic via network 230, an environment of network 230 (e.g., devices connected to network 230, other networks 230 to which network 230 is connected, etc.), and/or the like. Additionally, or alternatively, and as another example, network device 210 may determine that a condition is satisfied using information identifying criteria for determining whether the condition is satisfied, such as by performing a comparison of a value and a threshold value, determining whether a pattern of traffic matches a known pattern of traffic for an attack, and/or the like.

In some implementations, a device other than network device 210 may determine whether a condition is satisfied. For example, a device other than network device 210 may monitor traffic to determine whether a condition is satisfied. In some implementations, the device may monitor traffic related to multiple network devices 210. This improves determining whether a condition is satisfied by having a device receive a network 230-wide view of traffic received by multiple network devices 210 associated with network 230. Further, the device may provide instructions to a set of network devices 210 to modify security actions that are being performed to respond to a condition being satisfied, may provide information to network device 210 indicating that a condition has been satisfied, and/or the like. In this way, the other device may manage implementation of security rules for multiple network devices 210. In some implementations, a particular network device 210 may perform these functions for other network devices 210 associated with network 230.

In this way, network device 210 may receive an indication that a condition, of a set of conditions, has been satisfied, to permit network device 210 to determine a security action to perform.

As further shown in FIG. 5, process 500 may include determining a security action, of a set of security actions, to perform based on the condition being satisfied (block 520). For example, network device 210 may determine a security action, of a set of security actions, to perform based on the condition being satisfied. In some implementations, network device 210 may determine thousands, millions, billions, etc. of security actions to perform, thereby processing information that cannot be processed manually or objectively by a human actor.

In some implementations, network device 210 may determine a security action to perform based on performing a lookup of a security action that corresponds to satisfaction of the condition. Additionally, or alternatively, network device 210 may determine a security action based on input from a user of client device 220. For example, network device 210 may provide information indicating a determined security action and may request confirmation by a user of client device 220 to perform the security action and/or request that the user input a different security action that network device 210 is to perform.

Additionally, or alternatively, network device 210 may determine a security action based on prior security actions that network device 210 performed. For example, network device 210 may determine a security action based on prior security actions performed when the condition was satisfied. Additionally, or alternatively, and as another example, network device 210 may determine a security action based on prior input from a user of client device 220. Continuing with the previous example, network device 210 may determine that a user of client device 220 input information identifying a security action when the condition was previously satisfied (e.g., information identifying a different security action than the security action network device 210 determined via performing a lookup).

In this case, network device 210 may determine to perform the same security action as when the same condition was previously satisfied (e.g., rather than performing a security action identified via performing a lookup). This permits network device 210 to more accurately determine a security action to perform (e.g., relative to determining a security action to perform without regard to prior input by a user of client device 220), thereby conserving processing resources of network device 210 that would otherwise be consumed due to inaccurate determination of a security action.

In some implementations, determining a security action to perform based on a condition being satisfied permits network device 210 to dynamically implement various security actions based on whether a condition is satisfied. This conserves memory resources of network device 210 by reducing or eliminating a need for network device 210 to store different sets of security actions to perform for different scenarios. In addition, this improves a network administrator's ability to reconfigure a set of security rules based on a change in a scenario by reducing or eliminating the need for the network administrator to manually reconfigure information related to a set of security rules to cause network device 210 to implement a different set of security actions based on a change in a scenario. This additionally improves security of network 230 by reducing or eliminating manual intervention to respond to changing scenarios to modify a set of security actions implemented by network device 210.

In this way, network device 210 may determine a security action, of a set of security actions, to perform based on the condition being satisfied, to permit network device 210 to perform the security action and/or another action.

As further shown in FIG. 5, process 500 may include performing the security action and/or another action (block 530). For example, network device 210 may perform the security action and/or another action. In some implementations, network device 210 may perform thousands, millions, billions, etc. of actions, thereby performing a set of actions that cannot be performed manually or objectively by a human actor.

In some implementations, for example, network device 210 may perform a security action to drop traffic, permit traffic, deny traffic, route traffic, quarantine traffic, log traffic, and/or the like. Additionally, or alternatively, and as another example, network device 210 may perform an action to generate a report that identifies traffic that was dropped, permitted, logged, routed, and/or the like. Additionally, or alternatively, and as another example, network device 210 may perform an action to provide information for display that indicates a security action and/or another action that was performed. Additionally, or alternatively, and as another example, network device 210 may send a set of instructions to another network device 210 and/or client device 220 to cause the other network device 210 and/or client device 220 to perform a security action and/or another action. Additionally, or alternatively, and as another example, network device 210 may store information identifying the security action and/or the other action that network device 210 performed. For example, network device 210 may store the information to improve future performance of security actions and/or other actions, to improve performance of security actions and/or other actions by another network device 210, and/or the like.

In this way, network device 210 may perform the security action and/or another action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
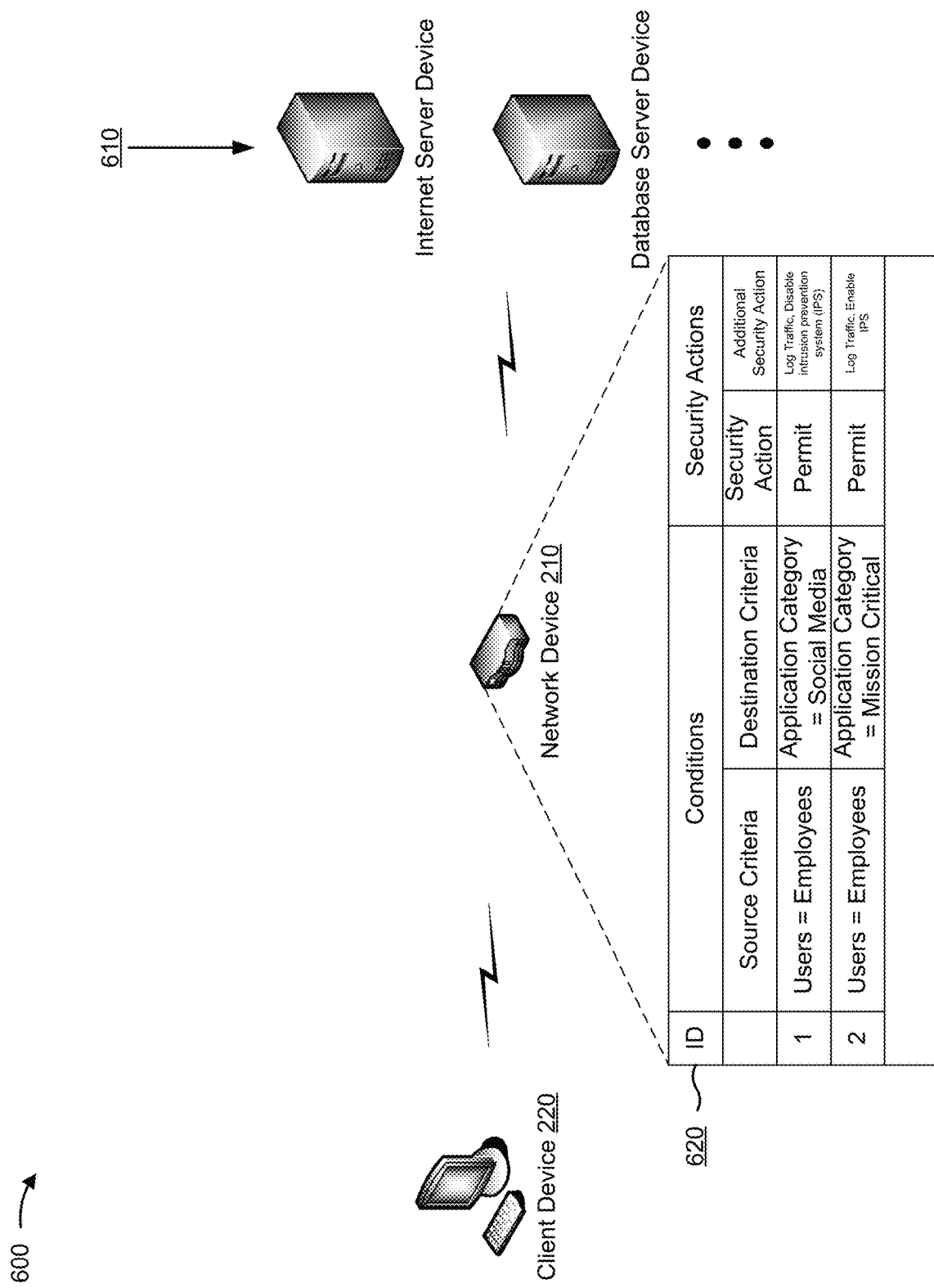
FIG. 6 is a diagram of an example implementation described herein.

FIG. 6 is a diagram of an example implementation 600 relating to example process 400 shown in FIG. 4. FIG. 6 shows an example environment in which the implementations described herein may be implemented.

As shown in FIG. 6, implementation 600 may include client device 220 and/or network device 210. As shown by reference number 610, example implementation 600 may include a set of server devices (e.g., an Internet server device, a database server device, etc.). In some implementations, a server device may include one or more devices capable of receiving, generating, storing, processing, and/or providing information. For example, a server device may include a server (e.g., in a data center or a cloud computing environment), a data center (e.g., a multi-server micro data center), a workstation computer, a virtual machine (VM) provided in a cloud computing environment, or a similar type of device. In some implementations, a server device may provide a service (e.g., to client device 220), such as a network service, a web service, a database service, a cloud application, and/or the like.

As shown by reference number 620, network device 210 may store information identifying a set of security rules similar to that described elsewhere herein. For example, network device 210 may use the set of security rules to determine whether client device 220 is permitted to access services provided by the set of server devices, information stored by the set of server devices, and/or the like.

In this way, network device 210 may be situated between client device 220 and a set of server devices to manage access to the set of server devices.

As indicated above, FIG. 6 is provided merely as an example. Other examples are possible and may differ from what was described with regard to FIG. 6.

In some implementations, the implementations described herein may be performed by a rule processing component (e.g., associated with switching component 310) that processes security rules, determines security actions to be performed, determines whether conditions are satisfied, and/or the like.

Some implementations, described herein, provide a network device that is capable of configuring a set of security rules, such that a security action performed based on the set of security rules varies depending on satisfaction of various conditions. For example, the network device may configure a security rule such that the network device performs a first security action when the security rule applies to traffic when a first condition is satisfied and performs a second security action when the security rule applies to traffic when a second condition is satisfied. In this way, the network device may automatically and dynamically implement a set of security rules based on various criteria being satisfied.

This permits the network device to quickly and efficiently perform various security actions in different scenarios, thereby increasing an efficiency of responding to different scenarios. In addition, this conserves network resources that would otherwise be consumed or damaged due to a delayed response to a particular scenario (e.g., a network attack, a threshold traffic scenario, etc.). Further, this reduces an amount of time needed to reconfigure a set of security rules for different scenarios, thereby increasing an efficiency of reconfiguring a set of security rules. Further, this conserves processing resources of the network device that would otherwise be consumed due to errors in manual modification of security rules to implement different security rules in different scenarios. Further, this conserves memory resources of the network device by reducing or eliminating a need for the network device to store multiple sets of security rules for multiple scenarios.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive condition information identifying a condition and a set of security actions,
the condition to control implementation of a set of security rules associated with a network security policy,
the condition information including first terms indicating:
a term or phrase associated with the condition,
a first security action, of the set of security actions, to apply when the condition is satisfied, and
a second security action, of the set of security actions, to apply when the condition is not satisfied,
the condition information being user-defined;
determine the set of security rules, from among a plurality of security rules, that is to be controlled by the condition after receiving a threshold amount of the condition information,
each security rule, of the set of security rules, including second terms identifying:
at least one of a source of traffic or a destination of the traffic to which a respective security rule applies, and
another security action, separate from the set of security actions, to be performed when the respective security rule applies to the traffic, and
where the one or more processors, when determining the set of security rules, are to:
process the threshold amount of the condition information, using natural language processing, to identify the term or phrase associated with the condition;
perform a comparison of the term or phrase associated with the condition to the second terms included in the plurality of security rules; and
identify the set of security rules that is to be controlled by the condition based on the comparison of the term or phrase associated with the condition to the second terms included in the plurality of security rules indicating a match that is based on a measure of similarity between the term or phrase associated with the condition to the second terms included in the plurality of security rules;
modify information related to the set of security rules to associate the set of security rules with the condition and to cause the implementation of the set of security rules to be controlled by the condition based on the match,
the modification to cause the device to process the set of security rules to dynamically implement the set of security actions based on whether the condition is satisfied, and
the modification to permit implementation of the set of security rules to be adaptive to a set of changes in a network;
perform an action after modifying the information related to the set of security rules; and
where the one or more processors, when performing the action, are to:
generate a report that identifies the first security action based on the condition being satisfied and a subset of security rules that cause the device to implement different security actions based on the condition being satisfied,
the report indicating whether a conflict exists between one or more security rules, of the set of security rules, and whether particular security actions were overridden based on the conflict,
provide the report for display via another device, and
receive an indication from the other device to perform the second security action rather than the first security action.

2. The device of claim 1, where the one or more processors are further to:
receive another indication that the condition has been satisfied;
determine the first security action to perform,
the first security action being associated with the condition; and
where the one or more processors, when performing the action, are to:

perform the first security action based on determining the first security action.

3. The device of claim 1, where the one or more processors, when modifying the information related to the set of security rules, are to:
modify information identifying the another security action that the device is to perform when the set of security rules applies to the traffic to cause the device to determine whether the condition is satisfied prior to performing the other security action.

4. The device of claim 1, where the one or more processors are further configured to:
determine that the condition is satisfied; and
determine the first security action using information identifying a prior security action that the device performed when the condition was previously satisfied.

5. The device of claim 1, where the one or more processors, when performing the action, are to:
monitor the network, a set of users associated with the network, the traffic, an environment of the device, or a set of applications associated with the network; and
determine whether the condition is satisfied based on monitoring the network, the set of users, the traffic, the environment, or the set of applications.

6. A non-transitory computer-readable medium storing instructions, the instructions comprising:
one or more instructions that, when executed by one or more processors, cause the one or more processors to:
receive condition information identifying a condition related to controlling implementation of a set of security rules,
the condition information including first terms indicating:
a term or phrase associated with the condition,
a first security action, of a set of security actions, to apply when the condition is satisfied, and
a second security action, of the set of security actions, to apply when the condition is not satisfied,
the condition information being user-defined;
determine, after receiving a threshold amount of the condition information identifying the condition, the set of security rules, from among a plurality of security rules, that is to be controlled by the condition using information related to the set of security rules,
each security rule, of the set of security rules, including second terms identifying:
at least one of a source of traffic or a destination of the traffic to which a respective security rule applies, and
another security action, separate from the set of security actions, to be performed when the respective security rule applies to the traffic,
the set of security rules being associated with a network security policy, and
where the one or more instructions, that cause the one or more processors to determine the set of security rules, further cause the one or more processors to:
process the threshold amount of the condition information, using natural language processing, to identify the term or phrase associated with the condition;
perform a comparison of the term or phrase associated with the condition to the second terms included in the plurality of security rules; and
identify the set of security rules that is to be controlled by the condition based on the comparison of the term or phrase associated with the condition to the second terms included in the plurality of security rules indicating a match that is based on a measure of similarity between the term or phrase associated with the condition to the second terms included in the plurality of security rules;
modify information related to the set of security rules to associate the set of security rules with the condition and to cause the implementation of the set of security rules to be controlled by the condition based on the match,
the modification to cause a device to process the set of security rules to dynamically implement the set of security actions based on whether the condition is satisfied, and
the modification to permit implementation of the set of security rules to be adaptive to a set of changes in a network;
perform an action after modifying the information related to the set of security rules,
the action including determining whether the condition is satisfied; and
where the one or more instructions, that cause the one or more processors to perform the action, cause the one or more processors to:
generate a report that identifies the first security action based on the condition being satisfied and a subset of security rules that cause the device to implement different security actions based on the condition being satisfied,
the report indicating whether a conflict exists between one or more security rules, of the set of security rules, and whether particular security actions were overridden based on the conflict,
provide the report for display via another device, and
receive an indication from the other device to perform the second security action rather than the first security action.

7. The non-transitory computer-readable medium of claim 6, where the one or more instructions, when executed by the one or more processors, further cause the one or more processors to:
determine whether the condition information and the information related to the set of security rules include a matching term or phrase; and
where the one or more instructions, that cause the one or more processors to determine the set of security rules, cause the one or more processors to:
determine the set of security rules based on determining whether the condition information and the information related to the set of security rules include the matching term or phrase.

8. The non-transitory computer-readable medium of claim 6, where the one or more instructions, when executed by the one or more processors, further cause the one or more processors to:
determine to perform the first security action based on determining that the condition is satisfied.

9. The non-transitory computer-readable medium of claim 6, where the one or more instructions, when executed by the one or more processors, further cause the one or more processors to:
receive another indication that the condition has been satisfied, the other indication being received from another device; and
determine the first security action to perform,
the first security action being associated with the condition.

10. The non-transitory computer-readable medium of claim 6, where the one or more instructions, when executed by the one or more processors, further cause the one or more processors to:
determine whether the condition is satisfied using a set of criteria; and
where the one or more instructions, that cause the one or more processors to perform the action, cause the one or more processors to:
perform the action based on determining whether the condition is satisfied using the set of criteria.

11. A method, comprising:
receiving, by a device, condition information identifying a condition and a set of security actions,
the condition to control implementation of a set of security rules,
the condition information including first terms indicating:
a term or phrase associated with the condition,
a first security action, of the set of security actions, to apply when the condition is satisfied, and
a second security action, of the set of security actions, to apply when the condition is not satisfied,
the condition being user-defined;
determining, by the device and after receiving a threshold amount of the condition information identifying the condition, the set of security rules, from among a plurality of security rules, that is to be controlled by the condition using information related to the set of security rules,
each security rule, of the set of security rules, including second terms identifying:
at least one of a source of traffic or a destination of the traffic to which a respective security rule applies, and
another security action, separate from the set of security actions, to be performed when the respective security rule applies to the traffic,
where determining the set of security rules includes:
processing the threshold amount of the condition information, using natural language processing, to identify the term or phrase associated with the condition;
performing a comparison of the term or phrase associated with the condition to the second terms included in the plurality of security rules; and
identifying the set of security rules that is to be controlled by the condition based on the comparison of the term or phrase associated with the condition to the second terms included in the plurality of security rules indicating a match that is based on a measure of similarity between the term or phrase associated with the condition to the second terms included in the plurality of security rules,
the information related to the set of security rules identifying:
the source of traffic to which the set of security rules applies, or
a destination of traffic to which the set of security rules applies;
modifying, by the device, the information related to the set of security rules to associate the set of security rules with the condition and to cause the device to determine whether the condition is satisfied prior to performing the set of security actions,
the modification to cause the device to process the set of security rules to dynamically implement the set of security actions based on whether the condition is satisfied, and
the modification to permit implementation of the set of security rules to be adaptive to a set of changes in a network based on the match;
performing, by the device, a security action, of the set of security actions, after modifying the information related to the set of security rules; and
where performing the action comprises:
generating a report that identifies the first security action based on the condition being satisfied and a subset of security rules that cause the device to implement different security actions based on the condition being satisfied,
the report indicating whether a conflict exists between one or more security rules, of the set of security rules, and whether particular security actions were overridden based on the conflict,
providing the report for display via another device, and
receiving an indication from the other device to perform the second security action rather than the first security action.

12. The method of claim 11, where determining the set of security rules comprises:
determining the set of security rules using input from another device,
the input identifying the set of security rules.

13. The method of claim 11, further comprising:
generating a set of instructions related to causing the device to determine whether the condition is satisfied prior to performing the set of security actions; and
where modifying the information related to the set of security rules comprises:
modifying the information related to the set of security rules to cause the device to use the set of instructions.

14. The method of claim 11, where modifying the information related to the set of security rules comprises:
modifying information included in a data structure to cause the device to determine whether the condition is satisfied prior to performing the set of security actions,
the data structure to be used to determine the set of security actions that the device is to perform when the set of security rules applies to the traffic.

15. The method of claim 11, further comprising:
determining the first security action and the second security action to perform based on input from another device; and
where performing the first security action or the second security action comprises:
performing the first security action or the second security action after determining the first security action and the second security action.

16. The method of claim 11, further comprising:
determining that the condition is satisfied;
determining the first security action to perform based on the condition being satisfied; and
where performing the first security action comprises:
performing the first security action based on determining the first security action; and performing the first security action after determining the first security action.

17. The device of claim 1, where the one or more processors are further to:
request confirmation of the modification to the information related to the set of security rules prior to modifying the information related to the set of security rules.

18. The non-transitory computer-readable medium of claim 6, where the one or more instructions, that cause the one or more processors to perform the action, cause the one or more processors to at least one of:
monitor the traffic to determine when to implement a security rule of the set of security rules;
monitor the network to detect when the network is under attack; or
generate one or more recommended modifications for another set of security rules.

19. The device of claim 1, where the one or more processors, when modifying the information related to the set of security rules, are further to:
modify the information related to the set of security rules to:
deny social media traffic when the network is under attack, and
permit social media traffic when the network is not under attack.

20. The non-transitory computer-readable medium of claim 18, where the one or more instructions, that cause the one or more processors to monitor the network to detect when the network is under attack, cause the one or more processors to:
monitor the network to detect when the network is under a denial of service attack and/or a man-in-the-middle attack.

* * * * *